United States Patent [19]

Burchill et al.

[11] Patent Number: 5,182,877
[45] Date of Patent: Feb. 2, 1993

[54] FISH LINE STRIPPING BASKET

[76] Inventors: Gary W. Burchill, 13 Sunnyfield Rd., Bedford, Mass. 01730; Frank E. Gillett, 24 Magazine St. #4; Rajan Ramaswamy, 57 Bishop Allen Dr. #1R, both of Cambridge, Mass. 02139; Peter S. Winslow, 23 Rolfe's La., Newbury, Mass. 01951

[21] Appl. No.: 906,792

[22] Filed: Jun. 30, 1992

[51] Int. Cl.$^5$ ............................................. A01K 97/00
[52] U.S. Cl. ............................................. 43/54.1; 43/57.1; 206/315.11; 224/245; 224/253; 224/920
[58] Field of Search .............. 43/54.1, 57.1, 57.2, 43/57.3; 206/315.11, 408, 389, 388; 242/96; 224/162, 242, 245, 253, 920

[56] References Cited

U.S. PATENT DOCUMENTS

| | | | |
|---|---|---|---|
| 2,098,636 | 11/1937 | Smith et al. | 224/920 |
| 2,451,468 | 10/1948 | Boyce | 206/389 |
| 2,537,613 | 1/1951 | Allen | 242/96 |
| 2,684,550 | 7/1954 | Reid | 43/27.4 |
| 2,822,116 | 2/1958 | Smalley et al. | 224/253 |
| 2,973,911 | 3/1961 | Rayburn | 206/389 |
| 3,179,351 | 4/1965 | Ehlert | 242/85.1 |
| 3,524,571 | 8/1970 | Young et al. | 224/920 |
| 3,629,966 | 12/1971 | Sanchez | 43/25 |
| 3,691,666 | 9/1972 | Herdwig | 43/54.1 |
| 4,297,802 | 11/1981 | Normann | 43/4 |
| 4,402,471 | 9/1983 | Normann | 242/96 |

Primary Examiner—Richard K. Seidel
Assistant Examiner—Chuck Y. Mah
Attorney, Agent, or Firm—Fish & Richardson

[57] ABSTRACT

A fish line stripping basket for releasable attachment upon a body surface of a fisherman in a position to receive line stripped from a fishing reel includes a base wall, one or more side walls and a rear wall. The walls together define a volume open at the top, with apertures for water to drain from within the volume. Slope-surfaced protuberances are disposed in a spaced apart pattern upon the base wall and project upwardly within the volume to improve release of the line during casting.

30 Claims, 5 Drawing Sheets

FISH LINE STRIPPING BASKET

BACKGROUND OF THE INVENTION

The invention relates to stripping baskets for use during fishing, e.g. during fly fishing, to hold loose coils of line stripped from the reel during retrieval and casting.

In fly fishing, line is also stripped from the reel for casting, and then retrieved. Between casts, the line is typically permitted to lay on the water about the fisherman. This procedure often proves unsatisfactory, e g., during salt water fly fishing, where longer casts may be required, resulting in more line to be handled. The greater length of line stripped from the reel, in combination with the movement of the water, e.g. due to wave action or water flow, can result in an unacceptable level of tangles, snarls and other problems.

Also, the maximum possible length of cast is reduced by the effects of friction acting on the line as it is pulled from the surface of the water during the cast.

In order to overcome these recognized problems, it has been known for fly fisherman to attach an open container or basket at his waist for receiving the line as it is stripped or retrieved. These containers or baskets have taken the form of dish drainers, or dish pans with outdoor carpeting covering the bottom surface. However, fishermen using these containers continued to have the problem of snarls as the loops of line collected in the container shift about and become entangled, e.g. as described in Normann U.S. Pat. No. 4,297,802 at column 1, lines 23-26.

Another prior art stripping basket has firm but flexible, generally upright fingers of monofilament, typically about 2-3 inches long, inserted into the bottom of a plastic tub, and again, the line occasionally became snagged on the fingers, shortening the cast.

SUMMARY OF THE INVENTION

According to the invention, a fish line stripping basket comprises a base wall, one or more side walls, a rear wall, the walls together defining a volume open at the top, and the walls further defining a plurality of apertures for water to drain from within the volume, means for releasable attachment of the basket upon the body of a fisherman in a position to receive line stripped from a fishing reel, and a multiplicity of slope-surfaced protuberances disposed in a spaced apart pattern upon the base wall and projecting upwardly within the volume.

Preferred embodiments of the invention may include one or more of the following features. The sloped-surface protuberances have the form of truncated cones with rounded tops. The slope-surfaced protuberances are of the order of about 1.25 inches high, having a diameter of about 1.50 inches at the base and a diameter of about 0.50 inch in an apex region. The rear wall and one or more side walls are sufficiently rigid in a vertical direction to support the base wall substantially perpendicular to the body surface upon which the basket is mounted. The rear wall is sufficiently flexible in a horizontal direction to conform generally to curvature of a body surface of a fisherman. The rear wall and the one or more side walls generally form a rectangle in plan view. Preferably, the basket is about 13 inches long, between opposed side walls, about 11 inches wide and about 5 inches deep. Also, the spaced-apart pattern of sloped-surface protuberances is preferably a three by three arrangement, with the sloped-surface protuberances having axial spacing of a distance of about 3.25 inches in a line between opposed side walls and axial spacing of a distance of about 2.75 inches in a line between the rear wall and an opposed side wall. The plurality of apertures are defined only by the base wall. The plurality of apertures are sufficient in number and flow capacity relative to the volume to allow a stripping basket of the volume full of water to drain about five seconds or less. Preferably, the base wall defines of the order of about forty apertures, the apertures each having a diameter of about 0.50 inch. The means for releasable attachment of the basket upon the body of a fisherman comprises a belt of adjustable length with a releasable snap lock adapted for operation with one hand. Preferably, the rear wall defines a plurality of slots through which the belt extends, with the snap lock selectively positionable for operation with one hand while a user's second hand is otherwise engaged.

According to another aspect of the invention, a fish line stripping basket comprises a base wall, one or more side walls, a rear wall sufficiently flexible in a horizontal direction to conform generally to curvature of a body surface of a fisherman, the rear wall and the one or more side walls generally forming a rectangle in plan view, the base wall, the rear wall and the one or more side walls together defining a volume open at the top, the base wall further defining a plurality of apertures for water to drain from within the volume, and the rear wall and the one or more side walls being sufficiently rigid in a vertical direction to support the base wall substantially perpendicular to the body surface upon which the basket is mounted, means for releasable attachment of the basket upon the body of a fisherman in a position to receive line stripped from a fishing reel, and a multiplicity of slope-surfaced protuberances disposed in a spaced apart pattern upon the base wall and projecting upwardly within the volume, the sloped-surface protuberances having the form of truncated cones with rounded tops.

Preferred embodiments of the invention may include one or more of the following features. The sloped-surface protuberances are of the order of about 1.25 inches high, having a diameter of about 1.50 inches at the base and a diameter of about 0.50 inch in an apex region, the basket is about 13 inches long, between opposed side walls, about 11 inches wide, and about 5 inches deep, and the spaced-apart pattern of sloped-surface protuberances is a three-by-three arrangement, the sloped-surface protuberances having axial spacing of a distance of about 3.25 inches in a line between opposed side walls and have axial spacing of a distance of about 2.75 inches in a line between the rear wall and an opposed side wall. The plurality of apertures are sufficient in number and flow capacity relative to the volume to allow a stripping basket of the volume full of water to drain in about five seconds or less. Preferably, the base wall defines of the order of about forty apertures, the apertures each having a diameter of about 0.50 inch. The means for releasable attachment of the basket upon the body of a fisherman comprises a belt of adjustable length with a releasable snap lock adapted for operation with one hand, and the rear wall defines a plurality of slots through which the belt extends, the snap lock being selectively positionable for operation with one hand while a user's second hand is otherwise engaged.

In preferred embodiments of both aspects of the invention, the stripping basket is formed of plastic, e.g., polyethylene about 0.150 inch thick.

Objectives of the invention include providing a stripping basket that allows a fisherman, e.g. a fly fisherman or a hand liner, in salt water or fresh water, to cast further, and experience less tangles, than with prior art equipment.

These and other features and advantages of the invention will be seen from the following description of a presently preferred embodiment, and from the claims.

DESCRIPTION OF THE PREFERRED EMBODIMENT(S)

Figure 1:
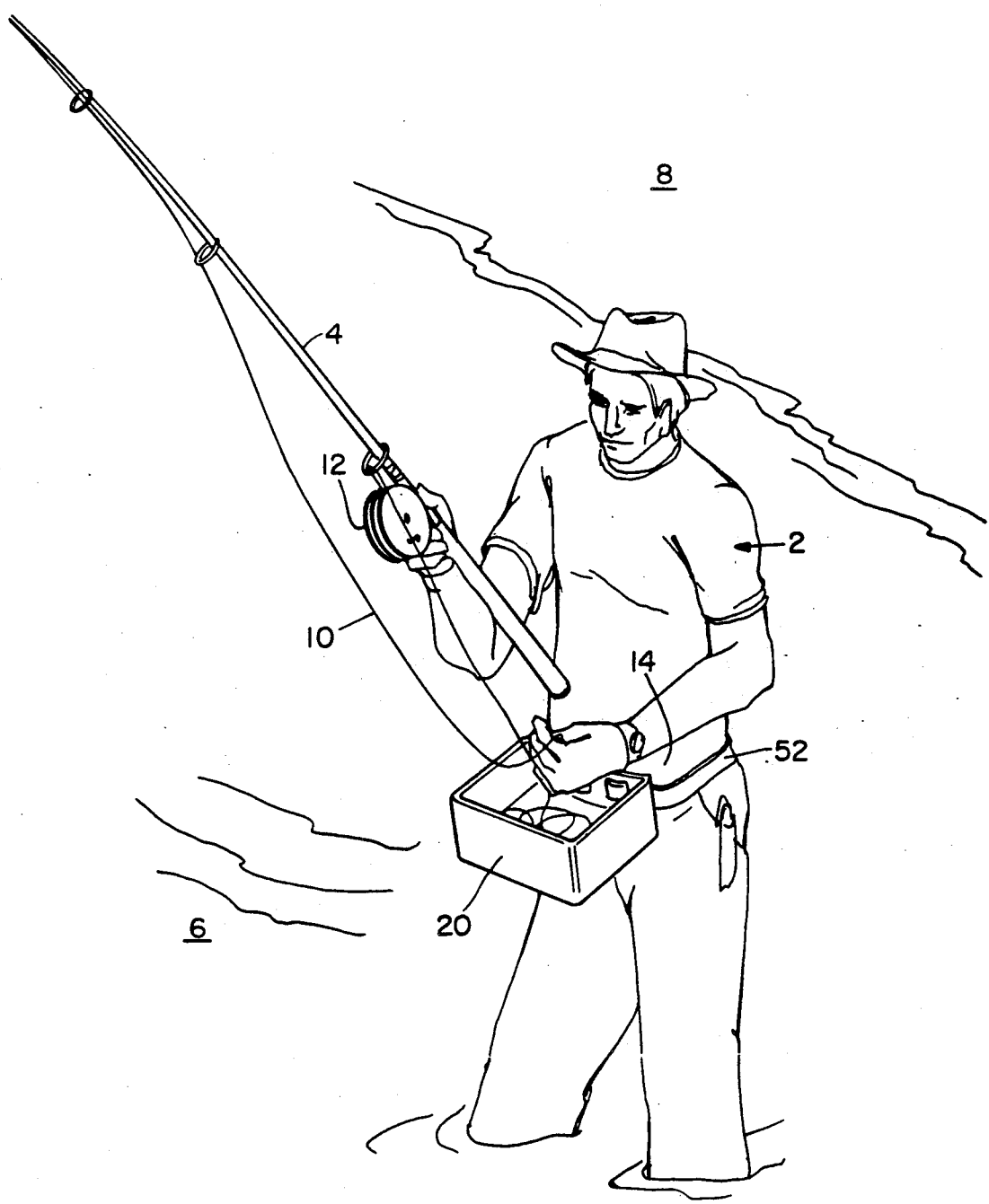
FIG. 1 is a perspective view of a fly fisherman employing a fish line stripping basket of the invention.

Referring now to FIG. 1, a fisherman 2 with a fly fishing rod 4 is wearing a fish line stripping basket 20 of the invention. For the purposes of explanation only, the fisherman is shown standing in the water 6, well away from the shore 8, e.g. on a tidal flat as the tide is rising, with the basket 20 positioned to catch the fishing line 10 as it is stripped from the fishing reel 12. It will be readily apparent that the basket 20 of the invention can be employed with similar advantage in other fishing situations where a length of fish line stripped from a fishing reel or hand spool would otherwise fall to lie upon the surface of, e.g., the water, ground, deck, pier or the like. As a result of the features and construction of the basket 10, as will be described in more detail below, the fisherman is able to cast and retrieve the fish line with improved efficiency and distance, and with reduced snags and snarls, as compared to prior art devices. This improved performance of particular importance to a fisherman in circumstances where the desired length of the typical cast (and thus the length of line that must be stripped from the reel and handled) is greater, e.g. in salt water fly fishing.

Figure 2:
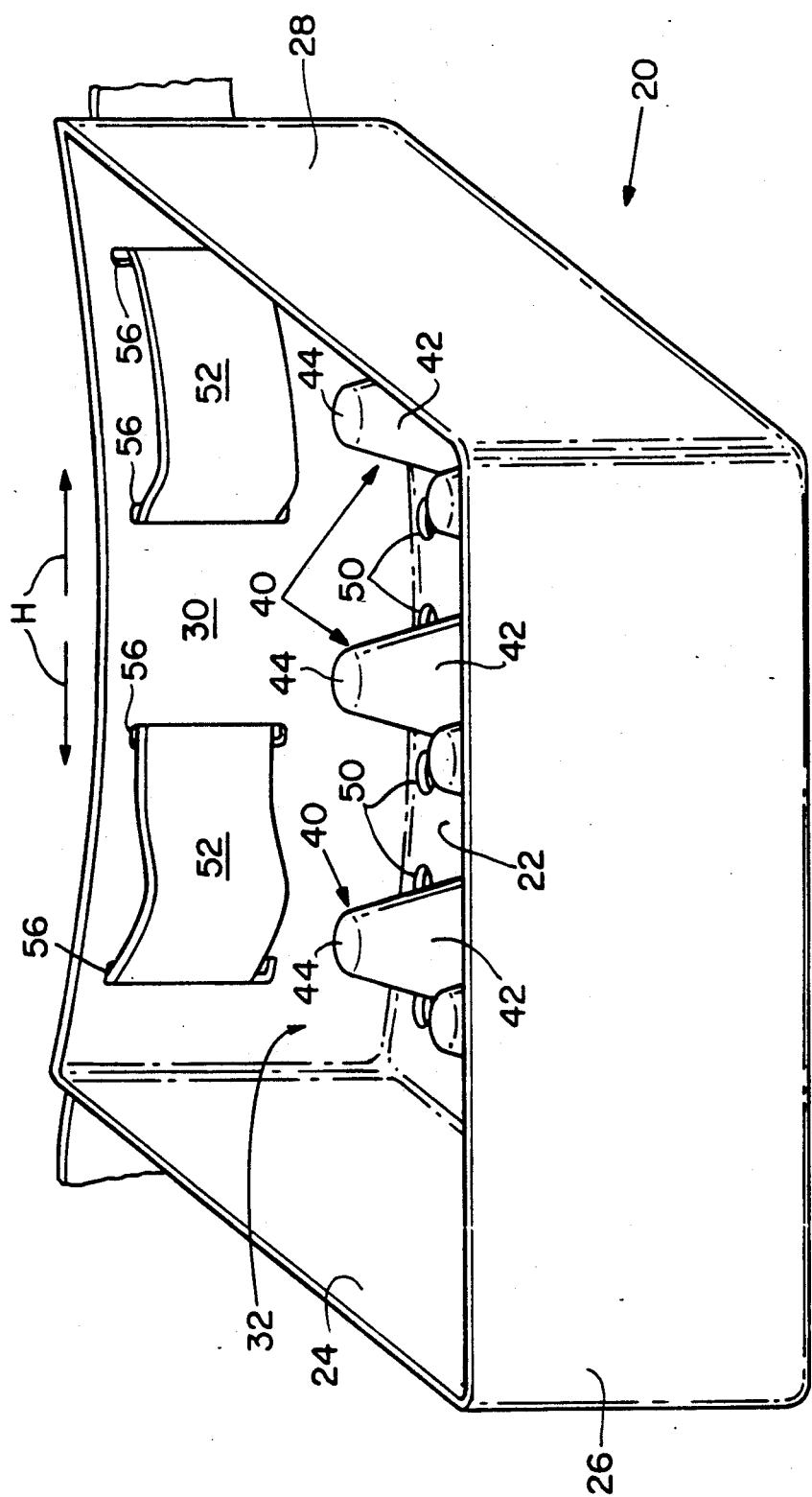
FIG. 2 is a perspective view of a stripping basket of the invention.

Referring now to FIG. 2 et seq., the fish line stripping basket 20 of the invention has a base wall 22, one or more side walls 24, 26, 28 and a rear wall 30 that is sufficiently flexible in a horizontal direction (arrow H, FIGS. 2 and 3) to conform generally to curvature of a body surface 14 of the fisherman 2.

In the preferred embodiment shown, the stripping basket 20 is formed of a suitable plastic material, e.g. polyethylene plastic about 0.150 inch thick. (Polyethylene is preferred because it floats on water, and also for light weight and increased flexibility over other suitable plastic materials, e.g. ABS plastic about 0.125 inch thick.) The stripping basket 20 has a rear wall 30 and side walls 24, 26, 28 generally forming a rectangle in plan view (FIG. 3), and together define a volume 32 that is open at the top 34. The basket 20 has a length, L (e.g., about 13 inches), between opposed side walls 24, 28, a width, W (e.g., about 11 inches), and a depth, D (e.g., about 5 inches).

A multiplicity of protuberances 40 with sloped or tapering surfaces 42 are disposed in a spaced apart pattern upon the base wall 22 and project upwardly within the volume 32. For example, in the preferred embodiment, the protuberances 40 have the form of truncated cones with rounded tops 44, each protuberance 40 having a height, $H_F$ (e.g., about 1.25 inches), with a base diameter, $D_B$ (e.g., about 1.50 inches), and an apex region diameter, $D_A$ (e.g., about 0.50 inch).

Figure 3:
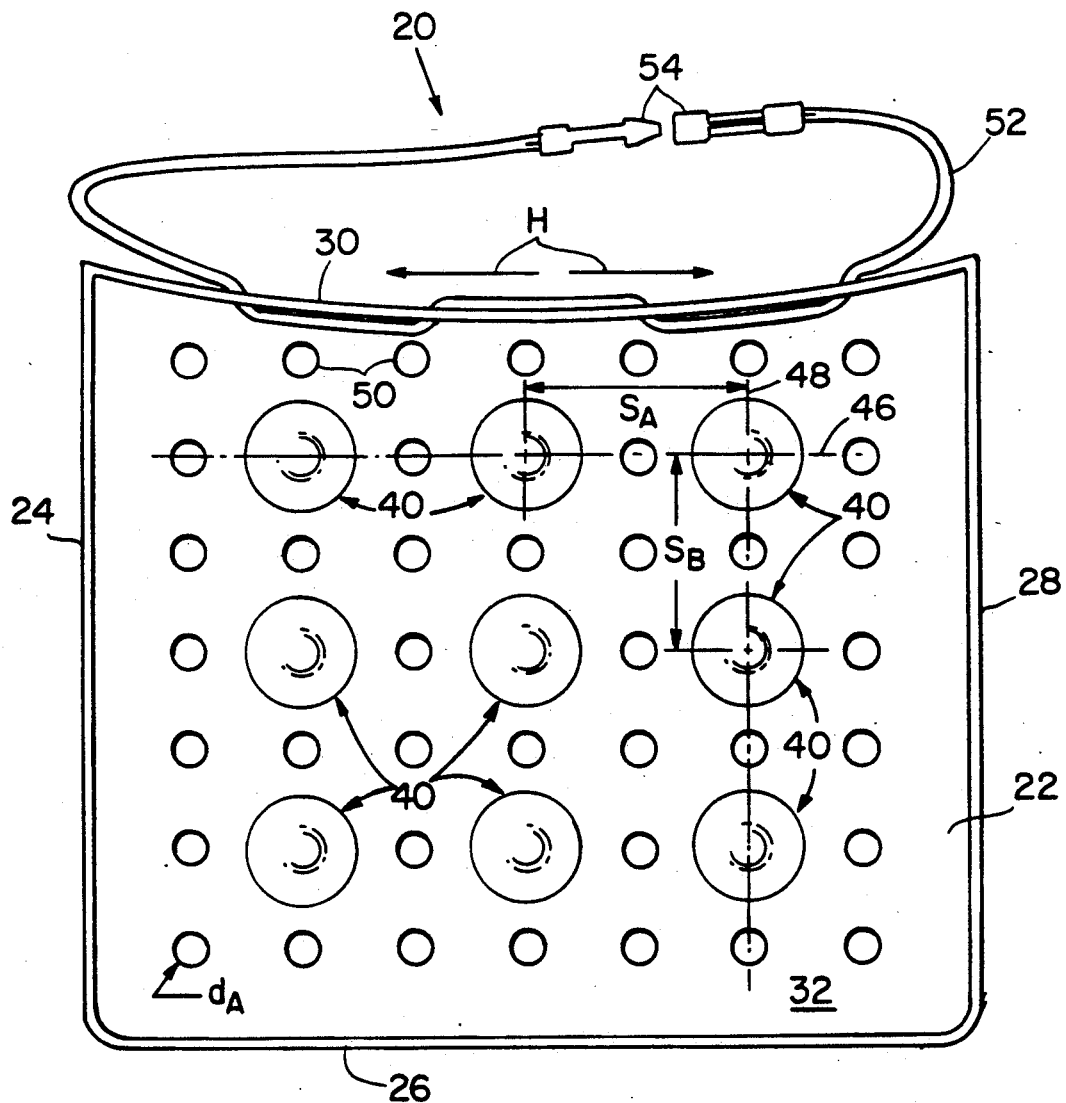
FIG. 3 is a top plan view of the stripping basket of FIG. 2.
Figure 4:
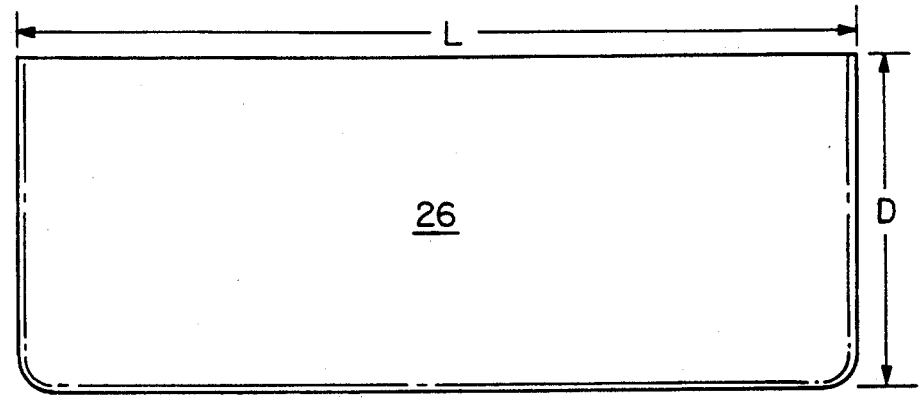
FIG. 4 is a front view of the stripping basket of FIG. 2.
Figure 5:
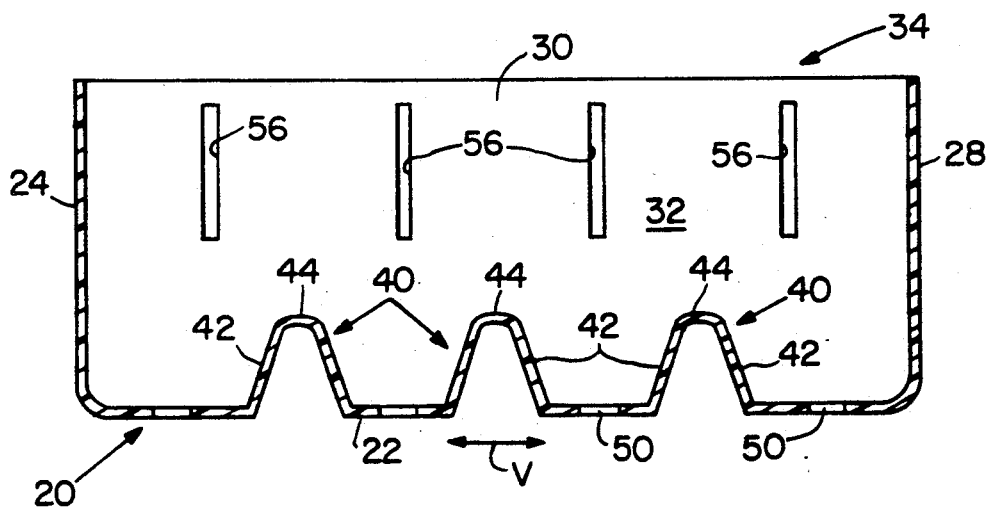
FIG. 5 is a front sectional view of the stripping basket of FIG. 2.
Figure 6:
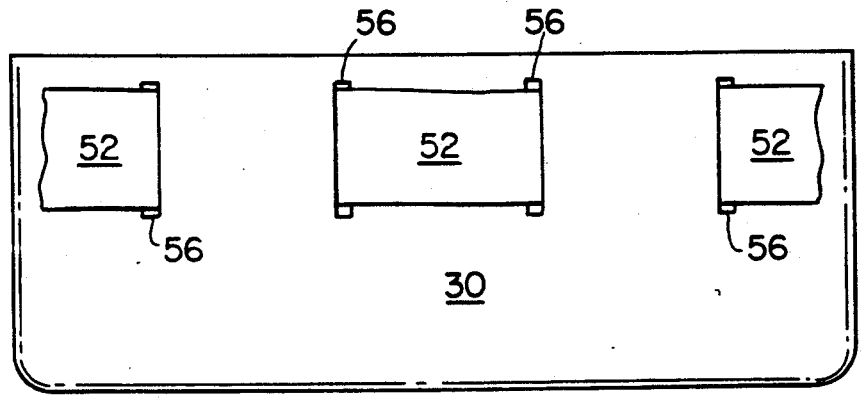
FIG. 6 is a rear view of the stripping basket of FIG. 2.
Figure 7:
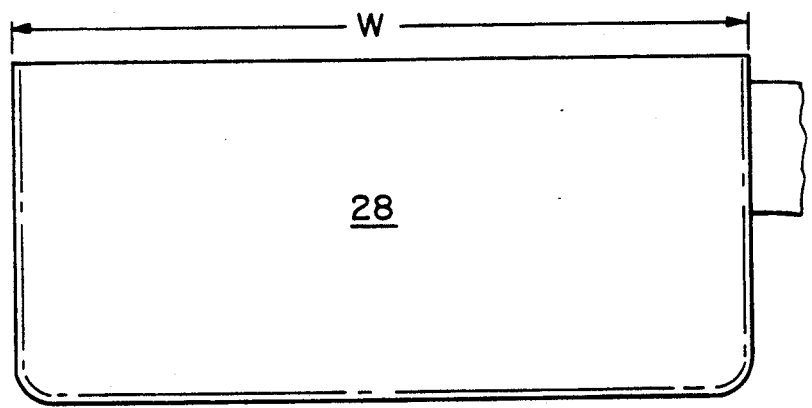
FIG. 7 is a first side view of the stripping basket of FIG. 2.
Figure 8:
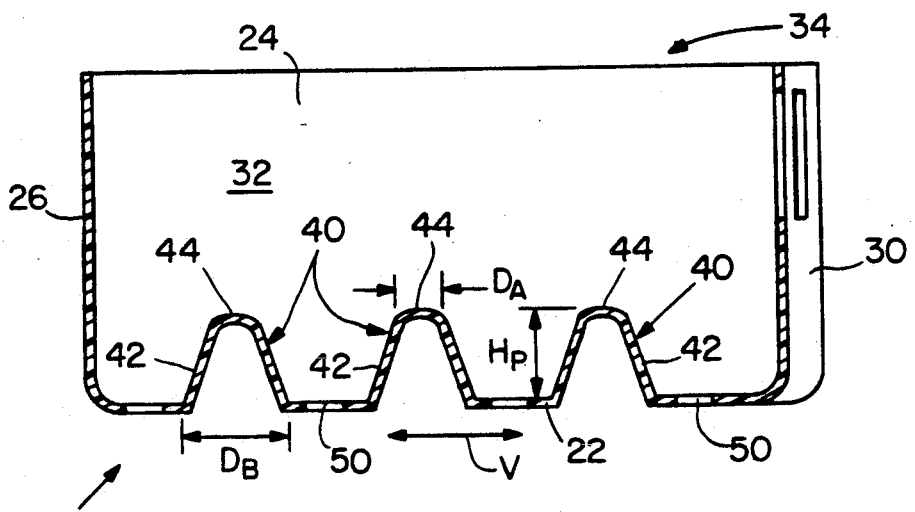
FIG. 8 is a side sectional view of the stripping basket of FIG. 2.
Figure 9:
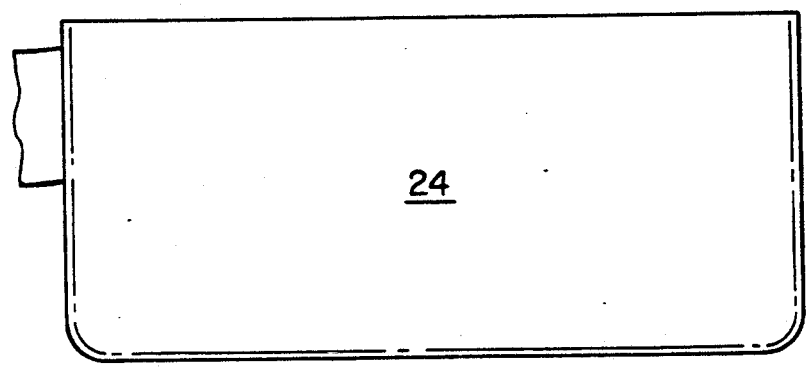
FIG. 9 is a second side view of the stripping basket of FIG. 2.

Referring to FIG. 3, the pattern of protuberances 40 is a three-by-three arrangement, with axial spacing, $S_A$ (e.g., a distance of about 3.25 inches), in side-to-side lines 34 between opposed side walls 24, 28 and axial spacing, $S_B$ (e.g., a distance of about 2.75 inches), in front-to-back lines 36 between the rear wall 30 and opposed side wall 26.

The base wall 22 also defines a plurality of apertures 50 for water to drain from within the volume 32. In the preferred embodiment, the apertures 50 are sufficient in number and flow capacity relative to the volume 32 to allow a stripping basket 20 full of water to drain in about five seconds or less, while limiting the amount of backwash that may flow into the volume through the apertures when waves strike against the undersurface of the base wall 22. For example, about forty apertures 50, each having a diameter $d_A$ (e.g., about 0.50 inch), may be provided.

The rear wall 30 and the side walls 24, 26, 28 are sufficiently rigid in a vertical direction (arrows, V) to support the base wall 22 substantially perpendicular to the fisherman's body surface 14 upon which the basket 20 is mounted.

The stripping basket 20 also includes means for releasable attachment of the basket upon the body of a fisherman 2 in a position to receive the fishing line 10 stripped from the reel 12. For example, in the embodiment shown, the means for releasable attachment of the basket upon the fisherman's body consists of a belt 52, e.g. a two-inch nylon web belt, of adjustable length and a releasable snap lock 54, e.g. a nylon plastic snap buckle. The snap lock is operable with one hand, and the belt is woven through a plurality of slots 56 defined in the rear wall 30 of the basket to place the lock 52 at the desired location relative to the basket, e.g. right or left side, or front. The basket 20 is attached about the waist (or, e.g., the thigh) of the fisherman 2 by means of the belt 52, and the lock 54 is positioned to be released by the fisherman with one hand while the other hand is engaged, e.g. playing a fish.

It has been found in practice that the tapered or sloped surfaces 42 of the protuberances 40 projecting upwardly from the base surface 22 of the basket 20 serve to prevent loops of fish line 10 collected within the volume 32 of the stripping basket 20 from sliding about and becoming entangled. The tapering surfaces 42 and rounded tops 44 of the protuberances 40 also allow the line to leave the volume 32 of the stripping basket 20 during casting without snagging. As a result, a fisherman 2 employing the fish line stripping basket 20 of the invention is able to cast further, and will experience less tangles, than with prior art stripping baskets.

Other embodiments are within the following claims. For example, the stripping basket 20 may be formed of other suitable plastic materials. The dimensions of the stripping basket of the invention, including the size, number and placement of the drainage apertures 50, may be varied as desired from those provided for the preferred embodiment.

What is claimed is:

1. A fish line stripping basket comprising
a base wall,
one or more side walls,
a rear wall,
said walls together defining a volume open at the top, and said walls further defining a plurality of apertures for water to drain from within said volume,
means for releasable attachment of said basket upon the body of a fisherman in a position to receive line stripped from a fishing reel, and
a multiplicity of slope-surfaced protuberances disposed in a spaced apart pattern upon said base wall and projecting upwardly within said volume.

2. The stripping basket of claim 1 wherein said sloped-surface protuberances have the form of truncated cones with rounded tops.

3. The stripping basket of claim 1 or 2 wherein said slope-surfaced protuberances are of the order of about 1.25 inches high, having a diameter of about 1.50 inches at the base and a diameter of about 0.50 inch in an apex region.

4. The stripping basket of claim 1 wherein said rear wall and said one or more side walls are sufficiently rigid in a vertical direction to support said base wall substantially perpendicular to the body surface upon which said basket is mounted.

5. The stripping basket of claim 1 wherein said rear wall is sufficiently flexible in a horizontal direction to conform generally to curvature of a body surface of a fisherman.

6. The stripping basket of claim 1 wherein said rear wall and said one or more side walls generally form a rectangle in plan view.

7. The stripping basket of claim 6 wherein the said basket is about 13 inches long, between opposed said side walls.

8. The stripping basket of claim 6 wherein the said basket is about 11 inches wide.

9. The stripping basket of claim 1 or 6 wherein said basket is about 5 inches deep.

10. The stripping basket of claim 6 wherein said spaced-apart pattern of sloped-surface protuberances is a three by three arrangement.

11. The stripping basket of claim 10 wherein said sloped-surface protuberances have axial spacing of a distance of about 3.25 inches in a line between opposed said side walls and have axial spacing of a distance of about 2.75 inches in a line between said rear wall and an opposed said side wall.

12. The stripping basket of claim 1 wherein said plurality of apertures are defined only by said base wall.

13. The stripping basket of claim 1 wherein said plurality of apertures are sufficient in number and flow capacity relative to said volume to allow a stripping basket of said volume full of water to drain in about five seconds or less.

14. The stripping basket of claim 1 or 12 wherein said base wall defines of the order of about forty apertures, said apertures each having a diameter of about 0.50 inch.

15. The stripping basket of claim 1 wherein said means for releasable attachment of said basket upon the body of a fisherman comprises a belt of adjustable length with a releasable snap lock adapted for operation with one hand.

16. The stripping basket of claim 15 wherein said rear wall defines a plurality of slots through which said belt extends, with said snap lock selectively positionable for operation with one hand while a user's second hand is otherwise engaged.

17. A fish line stripping basket comprising
a base wall,
one or more side walls,
a rear wall sufficiently flexible in a horizontal direction to conform generally to curvature of a body surface of a fisherman,
said rear wall and said one or more side walls generally forming a rectangle in plan view,
said base wall, said rear wall and said one or more side walls together defining a volume open at the top,
said base wall further defining a plurality of apertures for water to drain from within said volume, and
said rear wall and said one or more side walls being sufficiently rigid in a vertical direction to support said base wall substantially perpendicular to the body surface upon which said basket is mounted,
means for releasable attachment of said basket upon the body of a fisherman in a position to receive line stripped from a fishing reel, and
a multiplicity of slope-surfaced protuberances disposed in a spaced apart pattern upon said base wall and projecting upwardly within said volume, said sloped=surface protuberances having the form of truncated cones with rounded tops.

18. The stripping basket of claim 17 wherein.
said slope-surfaced protuberances are of the order of about 1.25 inches high, having a diameter of about 1.50 inches at the base and a diameter of about 0.50 inch in an apex region,
said basket is about 13 inches long, between opposed said side walls, about 11 inches wide, and about 5 inches deep, and
said spaced-apart pattern of sloped-surface protuberances is a three-by-three arrangement, said sloped-surface protuberances having axial spacing of a distance of about 3.25 inches in a line between opposed said side walls and have axial spacing of a distance of about 2.75 inches in a line between said rear wall and an opposed said side wall.

19. The stripping basket of claim 17 or 18 wherein said plurality of apertures are sufficient in number and flow capacity relative to said volume to allow a stripping basket of said volume full of water to drain in about five seconds or less.

20. The stripping basket of claim 19 wherein said base wall defines of the order of about forty apertures, said apertures each having a diameter of about 0.50 inch.

21. The stripping basket of claim 17 wherein said means for releasable attachment of said basket upon the body of a fisherman comprises a belt of adjustable length with a releasable snap lock adapted for operation with one hand, and said rear wall defines a plurality of slots through which said belt extends, with said snap lock selectively positionable for operation with one hand while a user's second hand is otherwise engaged.

22. The stripping basket of claim 1 or 17 wherein said basket is formed of plastic.

23. The stripping basket of claim 22 wherein said plastic is polyethylene about 0.150 inch thick.

24. A fish line stripping basket comprising:
a base wall,
one or more side walls,
a rear wall,
said walls together defining a volume open at the top,
means for releasable attachment of said basket upon the body of a fisherman in a position to receive line stripped from a fishing reel, and
a multiplicity of slope-surfaced protuberances disposed in a spaced apart pattern upon said base wall and projecting upwardly within said volume.

25. The stripping basket of claim 24 wherein said sloped-surface protuberances have the form of truncated cones with rounded tops.

26. The stripping basket of claim 24 wherein said rear wall and said one or more side walls are sufficiently rigid in a vertical direction to support said base wall substantially perpendicular to the body surface upon which said basket is mounted.

27. The stripping basket of claim 24 wherein said rear wall is sufficiently flexible in a horizontal direction to conform generally to curvature of a body surface of a fisherman.

28. The stripping basket of claim 24 wherein said rear wall and said one or more side walls generally form a rectangle in plane view.

29. The stripping basket of claim 24 wherein said means for releasable attachment of said basket upon the body of a fisherman comprises a belt of adjustable length with a releasable snap lock adapted for operation with one hand.

30. The stripping basket of claim 29 wherein said rear wall defines a plurality of slots through which said belt extends, with said snap lock selectively positionable for operation with one hand while a user's second hand is otherwise engaged.

* * * * *